US010454343B2

(12) United States Patent
Matsuda

(10) Patent No.: US 10,454,343 B2
(45) Date of Patent: Oct. 22, 2019

(54) COOLING FOR DRIVE MOTOR AND TRANSMISSION OF ELECTRIC VEHICLE

(71) Applicant: KAWASAKI JUKOGYO KABUSHIKI KAISHA, Kobe-shi, Hyogo (JP)

(72) Inventor: Yoshimoto Matsuda, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 560 days.

(21) Appl. No.: 14/901,053

(22) PCT Filed: Jul. 9, 2013

(86) PCT No.: PCT/JP2013/004251
§ 371 (c)(1),
(2) Date: Dec. 27, 2015

(87) PCT Pub. No.: WO2014/207787
PCT Pub. Date: Dec. 31, 2014

(65) Prior Publication Data
US 2016/0226344 A1 Aug. 4, 2016

(30) Foreign Application Priority Data

Jun. 27, 2013 (JP) ................. 2013-134778

(51) Int. Cl.
*H02K 9/19* (2006.01)
*B60K 11/04* (2006.01)
(Continued)

(52) U.S. Cl.
CPC ................. *H02K 9/19* (2013.01); *B60K 1/00* (2013.01); *B60K 1/04* (2013.01); *B60K 11/04* (2013.01);
(Continued)

(58) Field of Classification Search
CPC ............ H02K 9/19; H02K 9/24; H02K 9/193; H02K 9/197; H02K 9/28; H02K 9/00;
(Continued)

(56) References Cited

U.S. PATENT DOCUMENTS

2003/0230274 A1* 12/2003 Williams ................. F01M 1/02
123/196 R
2004/0194497 A1* 10/2004 Sasaki ....................... F01P 3/20
62/505
(Continued)

FOREIGN PATENT DOCUMENTS

JP H05169985 A 7/1993
JP 2000356148 A 12/2000
(Continued)

OTHER PUBLICATIONS

ISA Japanese Patent Office, International Search Report Issued in Application No. PCT/JP2013/004251, dated Oct. 15, 2013, WIPO, 4 pages.

Primary Examiner — Julio C. Gonzalez
Assistant Examiner — Alexander A Singh
(74) Attorney, Agent, or Firm — Alleman Hall Creasman & Tuttle LLP

(57) ABSTRACT

An electric vehicle comprises a driving power device which drives a wheel and includes a heat generating component which includes a heat generating component and generates heat during an operation thereof; a mechanical pump which is mechanically driven by the driving motor and supplies a coolant in an amount proportional to a rotational speed of the driving motor to the heat generating component; an electric pump which supplies the coolant to the heat generating component; and an electric pump control section which controls an operation of the electric pump; wherein the electric pump control section causes the electric pump to be driven upon determining that a required cooling capability (Continued)

value is larger than a mechanical cooling capability value of the mechanical pump, and stops causing the electric pump to be driven when the required cooling capability value is smaller than the mechanical cooling capability value.

18 Claims, 5 Drawing Sheets

(51) Int. Cl.
    *H02K 9/24*     (2006.01)
    *B62K 11/04*     (2006.01)
    *B60K 1/04*     (2019.01)
    *B60K 1/00*     (2006.01)
    *B60K 11/02*     (2006.01)

(52) U.S. Cl.
    CPC ............... *B62K 11/04* (2013.01); *H02K 9/24* (2013.01); *B60K 11/02* (2013.01); *B60K 2001/003* (2013.01); *B60K 2001/005* (2013.01); *B60K 2001/006* (2013.01); *B60Y 2200/12* (2013.01); *B62K 2204/00* (2013.01); *B62K 2208/00* (2013.01); *Y02T 10/641* (2013.01)

(58) Field of Classification Search
    CPC ............ H02K 9/005; H02K 9/12; H02K 9/16; H02K 9/18; B60K 2001/006; B60K 2001/003; B60K 2001/005; B60K 1/04; B60K 1/00; B60K 11/04; B60K 11/02; B62K 11/04; B62K 2204/00; B62K 2208/00; Y02T 10/641; B60Y 2200/12
    USPC ..... 310/52, 53, 54, 57, 58, 59, 60 R, 62, 63, 310/60 A, 64
    See application file for complete search history.

(56) References Cited

U.S. PATENT DOCUMENTS

| | | | |
|---|---|---|---|
| 2012/0143414 A1* | 6/2012 | Shin ................... | B60K 11/02 701/22 |
| 2013/0178792 A1* | 7/2013 | Li ...................... | A61M 5/155 604/67 |
| 2013/0229072 A1* | 9/2013 | Matsuda ............. | B62K 11/04 310/53 |
| 2014/0032085 A1* | 1/2014 | Free ................... | F01M 1/16 701/112 |

FOREIGN PATENT DOCUMENTS

| | | | | |
|---|---|---|---|---|
| JP | 2010195313 A | | 9/2010 | |
| WO | WO 2012063293 A1 | * | 5/2012 | ............ B62K 11/04 |
| WO | 2012090463 A1 | | 7/2012 | |

* cited by examiner

COOLING FOR DRIVE MOTOR AND TRANSMISSION OF ELECTRIC VEHICLE

TECHNICAL FIELD

The present invention relates to an electric vehicle which uses a motor as a driving power source. In particular, the present invention relates to an electric vehicle including a mechanical pump and an electric pump to supply a coolant to a driving power device.

BACKGROUND ART

An electric vehicle disclosed in Patent Literature 1 is configured to lubricate a driving power transmission mechanism and cool a driving power device, using common oil.

CITATION LIST

Patent Literature

Patent Literature 1: WO 2012/090463 A1

SUMMARY OF INVENTION

Technical Problem

The electric vehicle disclosed in Patent Literature 1 can effectively lubricate the driving power transmission mechanism. However, there is room for improvement in cooling of the driving power device.

The present invention has been developed to solve the above-described problem, and an object of the present invention is to provide an electric vehicle which can more effectively cool the driving power device.

Solution to Problem

To achieve the above-described object, an electric vehicle of the present invention comprises a driving power device which includes at least one heat generating component which generates heat during an operation of the heat generating component and drives a wheel; a mechanical pump which supplies a coolant to the heat generating component; an electric pump which supplies the coolant to the heat generating component; and an electric pump control section which controls an operation of the electric pump; wherein the at least one heat generating component includes a driving motor, wherein the mechanical pump is mechanically driven by the driving motor, and supplies to the heat generating component the coolant in an amount which is proportional to a rotational speed of the driving motor, wherein the electric pump control section causes the electric pump to be driven when the electric pump control section determines that a required cooling capability value corresponding to a required cooling capability required to cool the heat generating component is larger than a mechanical cooling capability value corresponding to a cooling capability of the mechanical pump, and wherein the electric pump control section stops causing the electric pump to be driven when the required cooling capability value is smaller than the mechanical cooling capability value.

In this configuration, the electric pump can compensate the insufficiency of the cooling capability of the mechanical pump, and it becomes possible to prevent the operation time of the electric pump from being undesirably increased.

Advantageous Effects of Invention

In accordance with the present invention, with the above-described configuration, the driving power device can be cooled more effectively, while reducing the electric power consumption of the electric pump.

DESCRIPTION OF EMBODIMENTS

Hereinafter, the embodiment of the present invention will be described with reference to the accompanying drawings. An electric vehicle according to the present embodiment is an electric motorcycle. The directions stated below, which are a forward and rearward direction and a rightward and leftward direction, are from the perspective of a rider straddling the electric motorcycle.

—Overall Configuration of Electric Motorcycle—

Figure 1:
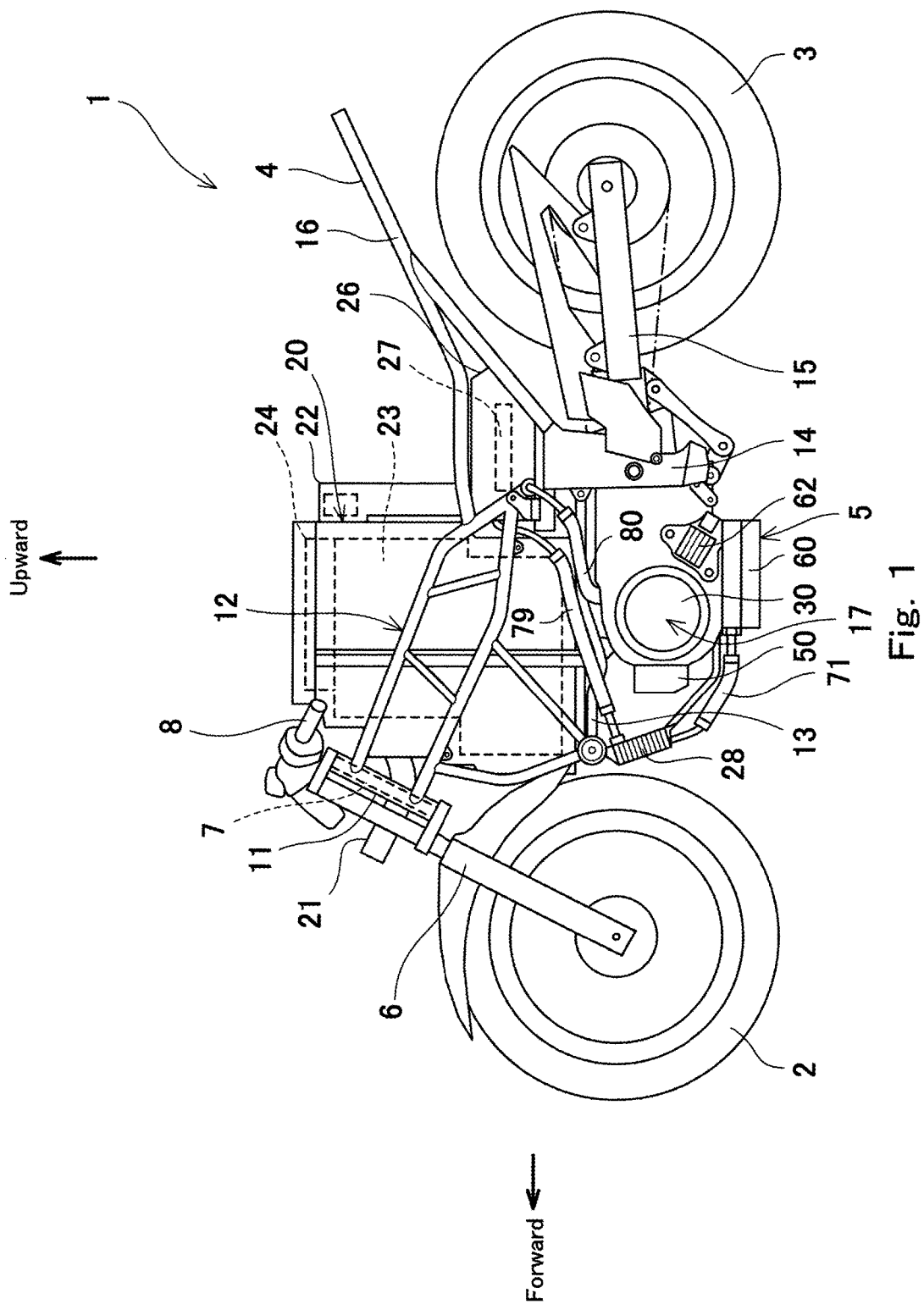
FIG. 1 is a left side view of an electric motorcycle according to the embodiment of the present invention.

FIG. 1 is a left side view of an electric motorcycle 1 according to the embodiment of the present invention. As shown in FIG. 1, the electric motorcycle 1 includes a front wheel 2 which is a driven wheel, a rear wheel 3 which is a drive wheel, a vehicle body frame 4 placed between the front wheel 2 and the rear wheel 3, and a motor unit 5 mounted to the vehicle body frame 4. The electric motorcycle 1 does not include an engine and is configured to rotate the rear wheel 3 by driving power generated by a driving motor 30 to allow the electric motorcycle 1 to travel on a road.

The front wheel 2 is rotatably mounted to the lower portion of a front fork 6. A steering shaft 7 is connected to the upper portion of the front fork 6. A handle 8 is attached to the upper portion of the steering shaft 7. A right grip (not shown) of the handle 8 is an accelerator grip 93a (see FIG. 4) for adjusting the driving power generated by the driving motor 30. When the accelerator grip 93a is rotated, the amount of rotation operation is detected by an accelerator sensor 93 (see FIG. 4).

The vehicle body frame 4 includes a head pipe 11, a pair of right and left main frames 12, a pair of right and left down frames 13, a pair of right and left pivot frames 14, a pair of right and left swing arms 15, and a seat frame 16. The seat frame 16 serves to support a seat (not shown) on which the rider and a passenger can be seated in the forward and rearward direction.

A battery case 20 is placed to be surrounded between the right and left main frames 12. An intake duct 21 is connected to the front surface of the battery case 20. An air intake port opens to face forward in the front end of the intake duct 21. An exhaust duct 22 is connected to the upper portion of the rear surface of the battery case 20. A battery unit 23 including a battery 24 is accommodated in the battery case 20.

An inverter case 26 is placed rearward relative to the lower portion of the battery case 20. An inverter 27 incorporating a power semiconductor such as an insulated-gate bipolar transistor (IGBT) is accommodated in the inverter case 26. The inverter 27 is electrically connected to the battery unit 23 accommodated in the battery case 20 by an electric power line (not shown) or the like. Each of the inverter 27 and the battery 24 is a heat generating component which generates heat during its operation, and is a part of a driving power device 17 which drives the rear wheel 3 (wheel).

The motor unit 5 is placed in a space below the battery case 20. The driving motor 30 is accommodated in the front portion of the motor unit 5. A transmission 40 (see FIG. 2) as a driving power transmission mechanism is accommodated in the rear portion of the motor unit 5. The right and left side portions of the rear portion of the motor unit 5 are fastened to the pivot frames 14, respectively. The right and left side portions of the front portion of the motor unit 5 are fastened to the down frames 13, respectively. The driving motor 30 is a heat generating component which generates heat during operation, and is a part of the driving power device 17 which drives the rear wheel 3 (wheel).

A terminal block 50 of the electric power line is provided on the front portion of the motor unit 5 and protrudes forward. An oil cooler 28 is placed in front of the terminal block 50 to be spaced apart therefrom. The upper portion of the oil cooler 28 is mounted to the down frames 13, while the lower portion of the oil cooler 28 is mounted to the front portion of the motor unit 5 via a stay 29 (see FIG. 2).

An oil pan 60 is provided on the lower portion of the motor unit 5. Oil reserved in the oil pan 60 is suctioned up by an electric pump 62 or the like and supplied to the oil cooler 28. This oil exchanges heat with ram air flowing through the oil cooler 28 and then is supplied to the inverter 27 and the driving motor 30 which are "heat generating components," as a "coolant" for cooling these components. Further, a part of the oil is supplied to a bearing 33 of a motor shaft 32 of the driving motor 30 and a gear train 45 (see FIG. 2) of the transmission 40, as a "lubricant" for lubricating these components.

The driving motor 30 of the present embodiment is a motor/generator which is capable of both a motor operation and a power generation operation. Specifically, the driving motor 30 performs the motor operation by the electric power supplied from the battery 24 via the inverter 27, and outputs the driving power to the rear wheel 3. The driving motor 30 performs the power generation operation during regenerative braking of the electric motorcycle 1. The inverter 27 converts AC power generated by the power generation operation of the driving motor 30 into DC power, which is stored in the battery 24.

—Configuration of Motor Unit—

Figure 2:
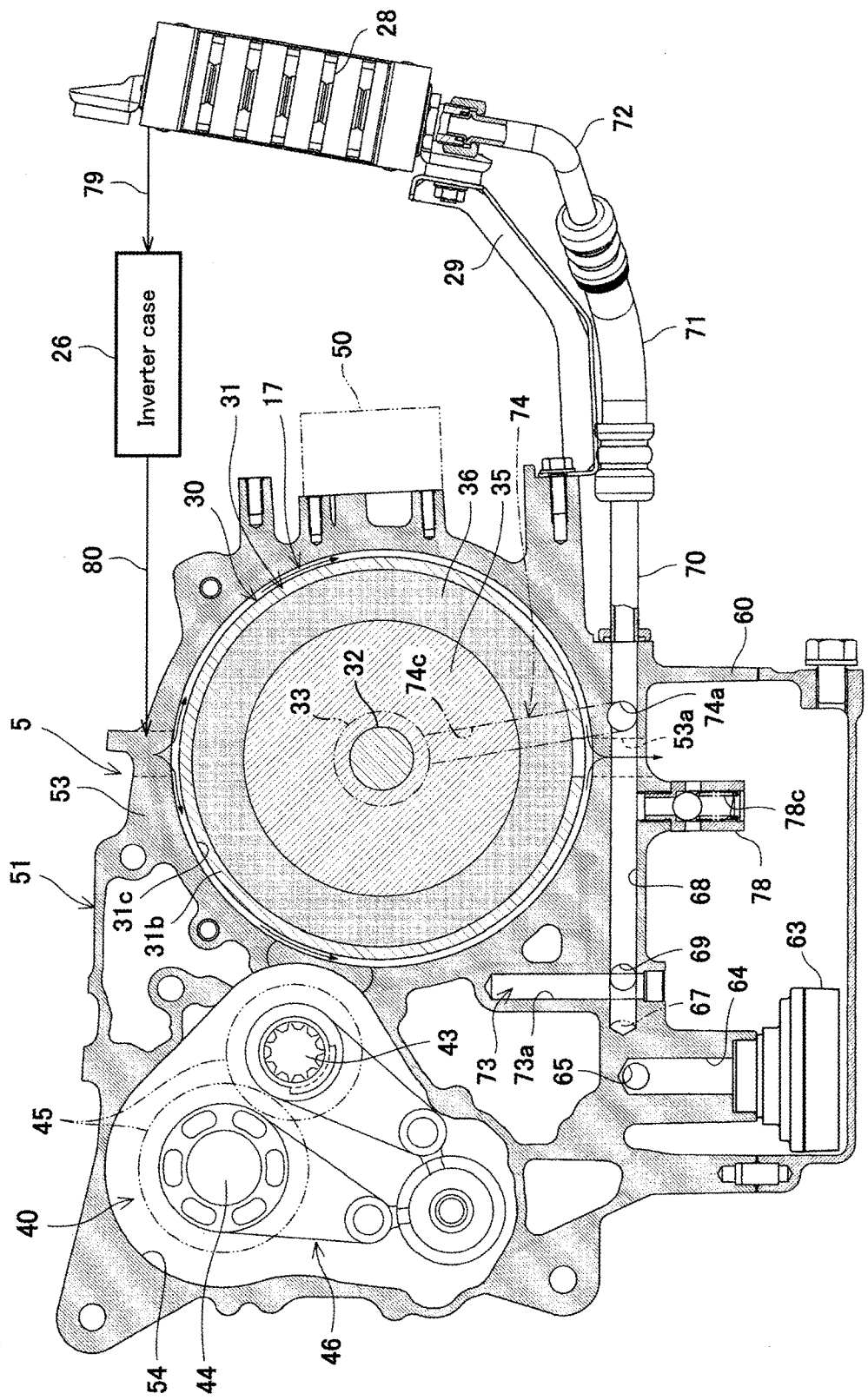
FIG. 2 is a cross-sectional view showing the structure of oil passages when a motor unit is viewed from the right.

FIG. 2 is a cross-sectional view of the motor unit 5, showing the structure of an oil supply system when viewed from the right side of the electric motorcycle 1. A case 51 of the motor unit 5 includes a motor accommodating section 53 and a transmission accommodating section 54 which are continuous in the forward and rearward direction.

The motor accommodating section 53 has a bottomed cylinder shape. A cylindrical motor case 31 of the driving motor 30 is accommodated in the motor accommodating section 53. A rotor 35 is mounted to the motor shaft 32 of the driving motor 30. A ring-shaped stator 36 is placed to surround the outer periphery of the rotor 35. A rotational angle sensor 37 (see FIG. 4) is attached to one end of the motor shaft 32. A cooling jacket 31c is provided in a space formed between the peripheral wall portion 31b of the motor case 31 and the motor accommodating section 53 to surround the stator 36.

The transmission 40 of a multistage type is placed rearward relative to the driving motor 30. A clutch mechanism is placed between the driving motor 30 and the transmission 40. The clutch mechanism is configured to perform switching between a state in which the driving power of the driving motor 30 is transmitted to the transmission 40 and a state in which the driving power of the driving motor 30 is cut off and is not transmitted to the transmission 40. The transmission 40 includes a transmission operation mechanism 46. The transmission operation mechanism 46 changes a ratio (change gear ratio) between an input rotation number and an output rotation number, namely, the gear position of the transmission 40. Instead of the transmission 40 of the multistage type, a gearless transmission of a belt type may be used, or a reduction gear mechanism with a constant change gear ratio may be used.

—Oil Supply System of Motor Unit—

Figure 3:
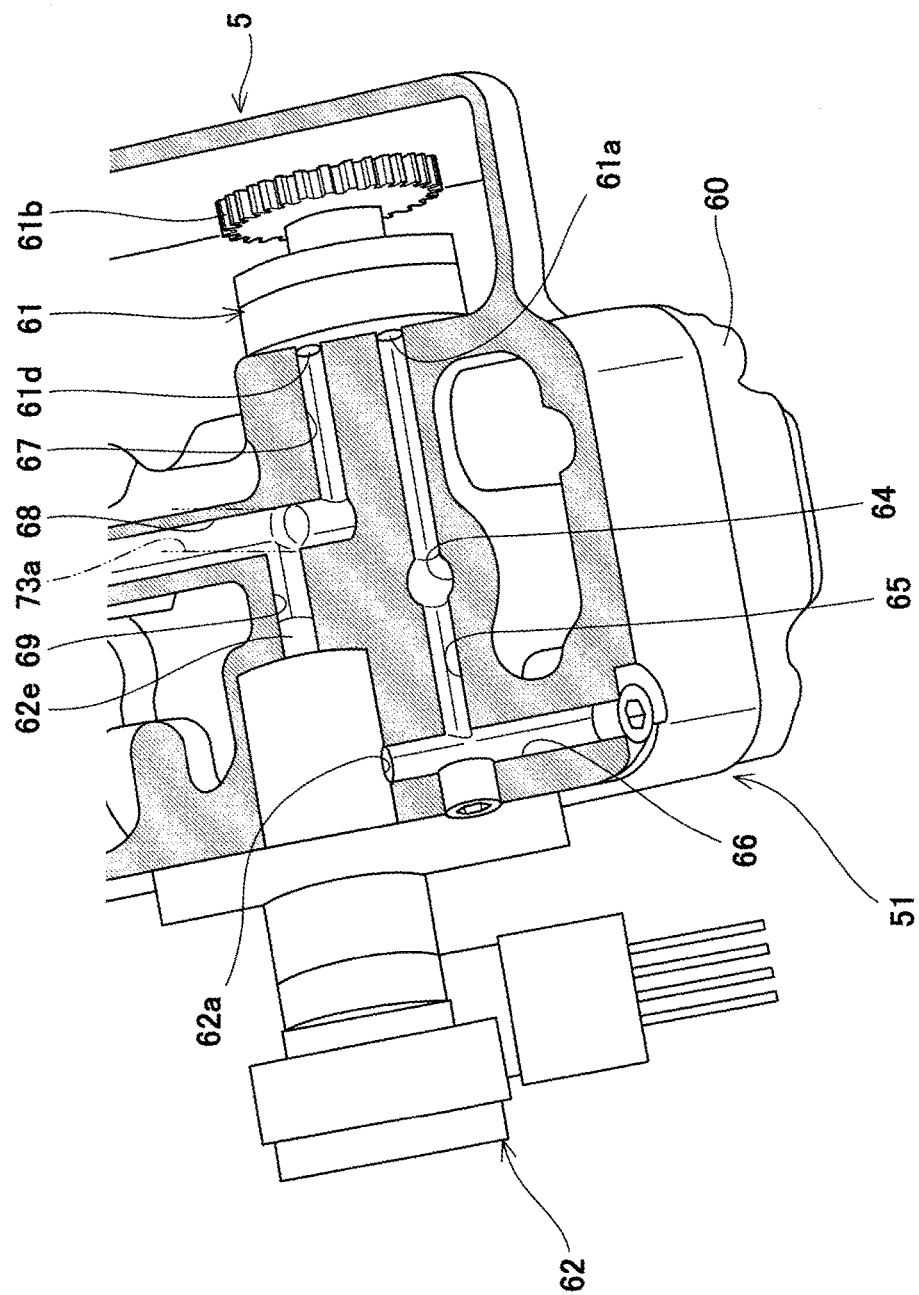
FIG. 3 is a perspective view showing the structure of the oil passages to which a mechanical pump and an electric pump are connected, a part of which is shown in a cross-section.

Next, the oil supply system of the motor unit 5 will be described with reference to FIGS. 2 and 3. FIG. 3 shows the structure of the oil passages to which a mechanical pump 61 and the electric pump 62 are connected. As shown in FIG. 2, the oil pan 60 is provided on the lower portion of the case 51 of the motor unit 5, to reserve the oil flowing downward from the motor accommodating section 53 and the transmission accommodating section 54. As shown in FIG. 3, the motor unit 5 includes the mechanical pump 61 and the electric pump 62 which are configured to suction up the oil reserved in the oil pan 60 via a common strainer 63 and to discharge the oil.

As shown in FIG. 2, the case 51 of the motor unit 5 is formed with a first oil suction passage 64 extending vertically. The upper end of the strainer 63 is connected to the lower end of the first oil suction passage 64. As shown in FIG. 3, the upper end of the first oil suction passage 64 is connected to a second oil suction passage 65 extending substantially horizontally in the rightward and leftward direction. The right end of the second oil suction passage 65 is connected to an oil suction port 61a of the mechanical pump 61, while the left end of the second oil suction passage 65 is connected to an oil suction port 62a of the electric pump 62 via a third oil suction passage 66 extending in the forward and rearward direction. In other words, the mechanical pump 61 and the electric pump 62 are placed to face each other in the rightward and leftward direction. The oil suction port 61a of the mechanical pump 61 and the oil suction port 62a of the electric pump 62 are connected to the common oil passage (first oil suction passage 64).

The mechanical pump 61 of FIG. 3 is placed below the transmission accommodating section 54 (see FIG. 2). A gear (not shown) which is rotatable together with a clutch gear 43 (see FIG. 2) is in mesh with a driven gear 61b of the mechanical pump 61. Therefore, the mechanical pump 61 is mechanically driven to operate by the driving motor 30, discharges the oil in an amount which is proportional to the rotational speed of the driving motor 30, from an oil discharge port 61d, and supplies the discharged oil to the heat generating components of the driving power device 17 (see FIG. 2), as the "coolant." The rotational speed and discharged oil amount of the mechanical pump 61 are increased with an increase in the rotational speed of the driving motor 30.

The electric pump 62 of FIG. 3 operates in response to a control command output from an electric pump control section 90a (see FIG. 4) of a controller 90. The electric pump 62 discharges the oil in an amount which is proportional to its rotational speed from an oil discharge port 62e, and supplies the discharged oil to the heat generating components of the driving power device 17 (see FIG. 2), as the "coolant." Unlike the rotational speed and discharged oil amount of the mechanical pump 61, the rotational speed and discharged oil amount of the electric pump 62 can be controlled irrelevantly to the rotational speed and operation of the driving motor 30.

As shown in FIG. 3, the oil discharge port 61d of the mechanical pump 61 is connected to the main oil passage 68 (common oil supply passage) via a first oil discharge passage 67, while the oil discharge port 62e of the electric pump 62 is connected to the main passage 68 via a second oil discharge passage 69. As shown in FIG. 2, the main oil passage 68 is a drill hole formed by drilling the case 51 from the front surface of the case 51 to a rear side thereof. The first oil discharge passage 67 is connected to the rear end of the main oil passage 68, from the right. The second oil discharge passage 69 is connected to a portion of the main oil passage 68 from the left, the portion being located a little forward (downstream in an oil flow direction) relative to a portion of the main oil passage 68 to which the first oil discharge passage 67 is connected.

As shown in FIG. 2, the case 51 of the motor unit 5 is formed with a transmission oil passage 73 which branches from the main oil passage 68, to supply the oil as the "lubricant" to the transmission 40. The transmission oil passage 73 includes a first transmission oil passage 73a branching from the main oil passage 68 and extending upward, and a second transmission oil passage (not shown) connected to the upper end of the first transmission oil passage 73a. The lower end of the first transmission oil passage 73a is connected to a portion of the main oil passage 68, to which the second oil discharge passage 69 extending from the electric pump 62 is connected. The second transmission oil passage (not shown) extends to a region near the gear train 45 or bearings (not shown) of the transmission 40, to supply the oil to these components.

As shown in FIG. 2, the case 51 of the motor unit 5 is formed with a motor oil passage 74 which branches from the main oil passage 68, to supply the oil as the "lubricant" to the bearing 33 of the driving motor 30. The motor oil passage 74 includes a first motor oil passage 74a which branches from the main oil passage 68 in a location (downstream of the transmission oil passage 73 in the oil flow direction) which is below the motor accommodating section 53, namely, on a front side of the case 51 of the motor unit 5, and extends in the rightward and leftward direction, and two second motor oil passages 74c extending from the right and left ends of the first motor oil passage 74a toward the motor shaft 32. A hydraulic (oil pressure) sensor 77 (see FIG. 4) is attached to the first motor oil passage 74a. The pressure of the oil flowing through the first motor oil passage 74a is substantially equal to the pressure of the oil supplied to the bearing 33 of the driving motor 30. The value of this oil pressure in the first motor oil passage 74a is detected, and the operation of the electric pump 62 is controlled based on this pressure value. In this way, a desired state in which the oil is supplied to the components or members of the motor unit 5 can be maintained.

As shown in FIG. 2, a relief valve 78 is provided between a branch location at which the transmission oil passage 73 branches from the main oil passage 68, and a branch location at which the motor oil passage 74 branches from the main oil passage 68. The relief valve 78 is normally closed. When the oil pressure in the main oil passage 68 reaches a predetermined value or larger, the relief valve 78 releases the oil pressure in the main oil passage 68.

As shown in FIG. 2, the rear end of a pipe member 70 is connected to the front end of the main oil passage 68 which opens in the front surface of the case 51. The front end of the pipe member 70 is connected to the rear end of a lower hose 71. The front end of the lower hose 71 is connected to the lower portion of the oil cooler 28 via a pipe member 72. An upper hose 79 is provided between the upper portion of the oil cooler 28 and the inverter case 26 located rearward relative to the oil cooler 28 and connects the upper portion of the oil cooler 28 to the inverter case 26. A return hose 80 is provided between the inverter case 26 and the motor unit 5 and connects the inverter case 26 to the motor unit 5. The lower end of the return hose 80 is connected to the upper portion of the case 51 of the motor unit 5.

A part of the oil discharged from each of the mechanical pump 61 and the electric pump 62 radiates heat by heat exchange with the ram air while flowing upward through the core of the oil cooler 28, and cools the inverter 27 while flowing through the cooler (not shown) of the inverter case 26. The cooler of the inverter case 26 has a labyrinth oil passage which is not shown. The oil supplied to the inverter case 26 takes the heat out of the inverter 27 while flowing through the oil passage of the inverter case 26. After flowing out of the oil cooler 28, the oil flows into a cooling jacket 31c formed inside of the case 51 through the return hose 80. In the cooling jacket 31c, the oil flows downward along the periphery of the motor case 31 while taking the heat out of the driving motor 30 (in particular, the stator 36), and falls to the interior of the oil pan 60 through an oil discharge port 53a at the lower portion of the motor accommodating section 53.

—Control System of Electric Pump—

Figure 4:
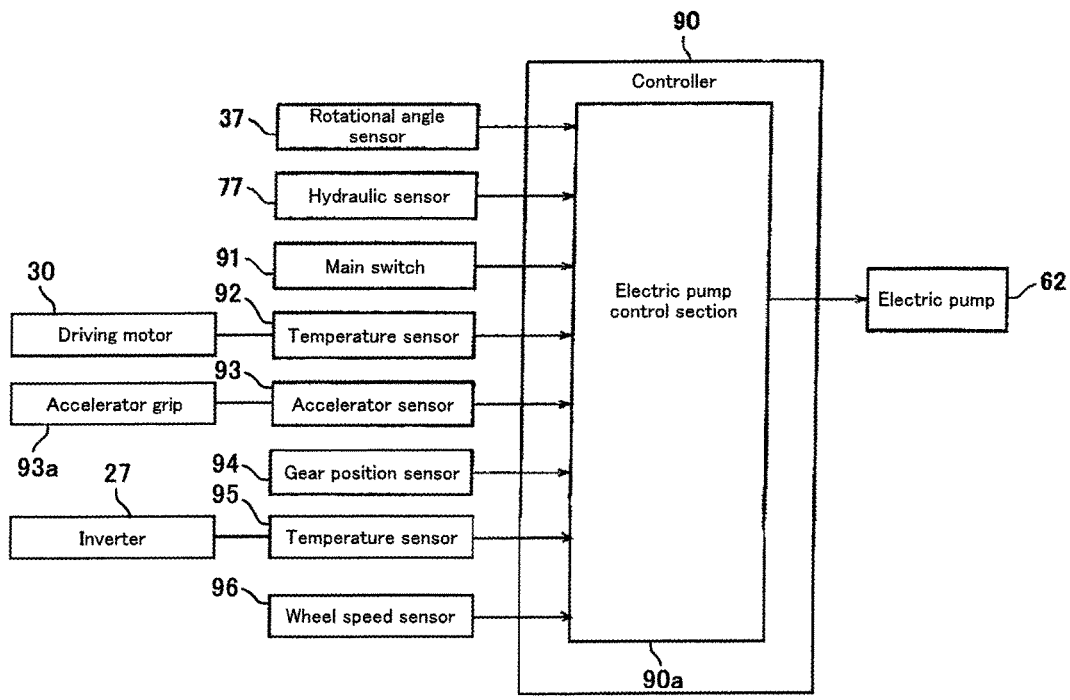
FIG. 4 is a functional block diagram showing a control system of the electric pump.

FIG. 4 is a functional block diagram of the control system of the electric pump 62. In the present embodiment, the controller 90 which controls the operation of the driving motor 30 includes the electric pump control section 90a which controls the operation of the electric pump 62. The electric pump control section 90a controls the operation of the electric pump 62 to compensate the oil discharge characteristic of the mechanical pump 61. The electric pump control section 90a is realized by software processing performed by a microcomputer of the controller 90.

A rotational angle sensor 37 of the driving motor 30, the hydraulic sensor 77, a main switch 91 of the electric motorcycle 1, a temperature sensor 92 which detects the temperature of the driving motor 30, an accelerator sensor 93 which detects the operation amount of the accelerator grip 93a, a gear position sensor 94 which detects the gear position, a temperature sensor 95 which detects the temperature of the inverter 27, a wheel speed sensor 96 which detects a traveling speed of the electric motorcycle 1, etc., are connected to the electric pump control section 90a. The electric pump control section 90a receives the signals from these sensors as inputs.

Figure 5:
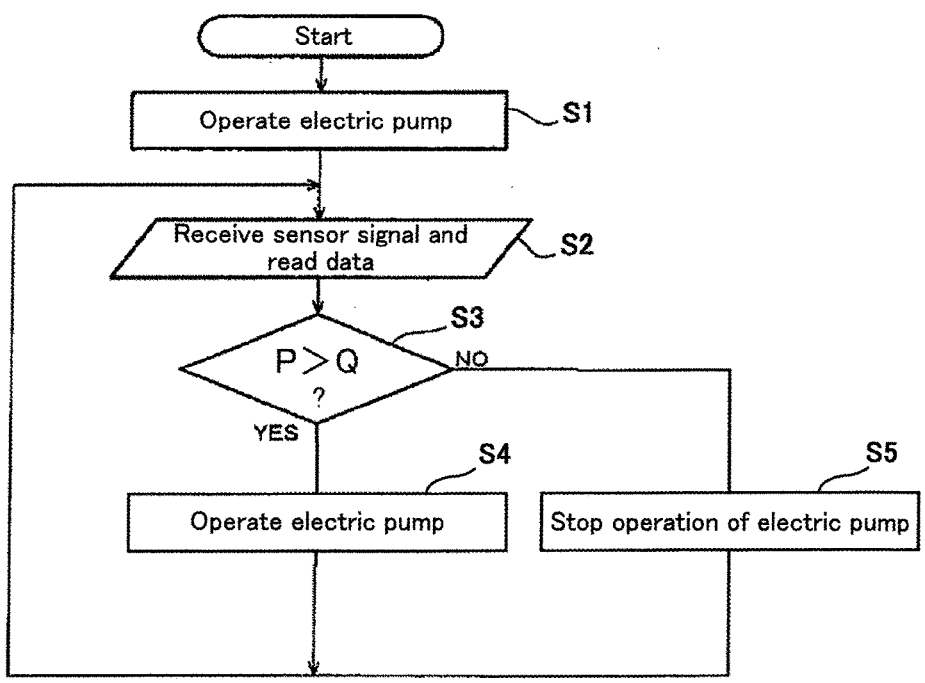
FIG. 5 is a flow diagram showing the procedure for controlling the operation of the electric pump, which is performed by an electric pump control section.
Figure 6:
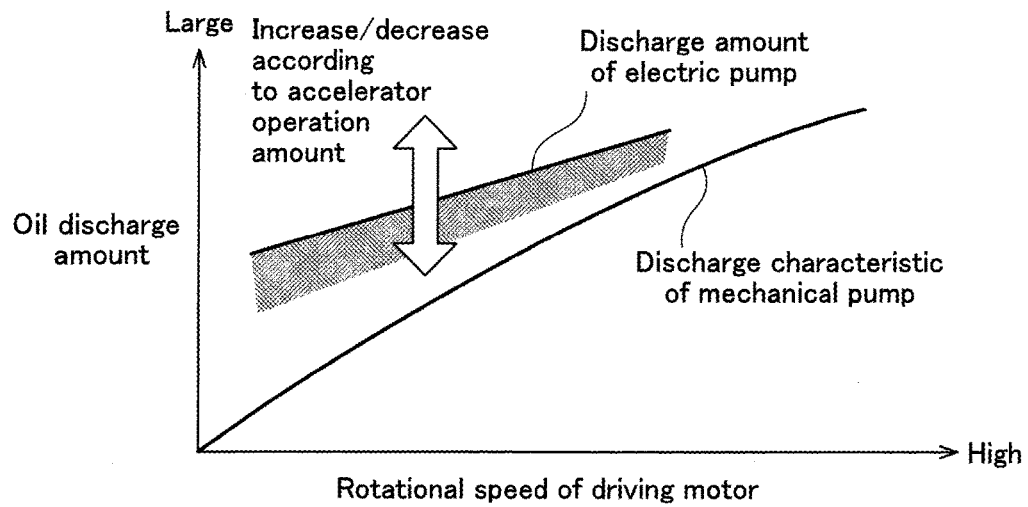
FIG. 6 is a graph showing an example in which the cooling capability of the mechanical pump is compensated by the operation of the electric pump.

Now, the control of the operation of the electric pump 62, which is performed by the electric pump control section 90a, will be specifically described with reference to FIGS. 5 and 6. FIG. 5 is a flow diagram showing the procedure for controlling the operation of the electric pump 62. FIG. 6 is a graph showing an example in which the discharge characteristic of the mechanical pump 61 is compensated by the operation of the electric pump 62.

The flow of FIG. 5 starts, when the main switch 91 is turned on. In a state in which the main switch 91 is in the on-state, the controller 90 prepares for traveling of the electric motorcycle 1 by, for example, checking the operations of the sensors. At a stage of preparing for traveling, the electric pump control section 90a executes step S1 and sends an operation command to the electric pump 62. In other words, the electric pump control section 90a operates the electric pump 62 (causes the electric pump 62 to be driven) at the stage of preparing for traveling. This makes it possible to reduce a time that passes until the components to be lubricated are filled with the oil, compared to a case where the electric pump 62 is operated after the preparation for traveling is completed. In the case of an electric vehicle including a keyless system, the electric pump control section 90a may operate the electric pump 62 in response to a signal output from a seat sensor. The seat sensor outputs the signal at a time point when the rider carrying a remote controller key straddles the seat in a state in which the main switch 91 is in an off-state.

In response to the operation command, the electric pump 62 is driven for a preset time (e.g., 5 to 10 seconds). The electric pump 62 sends the oil to the main oil passage 68, and then stops its operation. The operation time of the electric pump 62 in step S1 is set to a time required to fully fill the components to be lubricated, with the oil. During preparation for traveling, the electric pump control section 90a executes this control, irrespective of a time or period for which the electric motorcycle 1 was stopped. For example, during preparation for traveling, after the electric motorcycle 1 has been left unused for a long period of time (several months or several years), the electric pump control section 90a executes the above-described control in the same manner.

By the operation of the electric pump 62, the oil is sent to the main oil passage 68. A part of this oil is supplied to the transmission 40 through the transmission oil passage 73 to lubricate the gear train 45 and the bearings. Further, a part of this oil is supplied to the driving motor 30 through the motor oil passage 74 to lubricate the bearing 33. Moreover, a part of this oil is supplied to the inverter 27 and the driving motor 30 through the oil cooler 28 to cool the inverter 27 and the driving motor 30. At this time, the driving motor 30 and the inverter 27 which are not operated, generate a smaller amount of heat. In light of this, the rotational speed of the electric pump 62 is set to be low, and thus wasteful electric power consumption in the electric pump 62 can be reduced. After the oil is supplied to the components in the above-described manner, oil films formed on the components to be lubricated are kept for some time.

During the stopped state of the electric motorcycle 1, the operation of the driving motor 30 is stopped to reduce the electric power consumption. For this reason, during the stopped state of the electric motorcycle 1, the mechanical pump 61 does not supply the oil to the components to be lubricated, such as sliding portions or rotating portions. At a stage of low-speed traveling of the electric motorcycle 1, after the electric motorcycle 1 has started, the rotational speed of the driving motor 30 is low, and therefore it is difficult to sufficiently supply the oil to the components to be lubricated, by use of only the mechanical pump 61. In the present embodiment, during preparation for traveling, the electric pump 62 is operated. This makes it possible to start the operation of the driving motor 30 in the state in which the oil films are kept on the components to be lubricated. In this way, it becomes possible to prevent an oil shortage in the components to be lubricated. After the components to be lubricated are fully filled with the oil, the mechanical pump 61 rotates at a predetermined low rotational speed. As a result, it becomes possible to prevent an oil shortage in the components to be lubricated.

In step S1, when a predetermined time passes after the operation of the electric pump 62 was stopped, the electric pump 62 may be driven again to supply the oil to the components to be lubricated. This makes it possible to reliably prevent a situation in which there is an oil shortage in the components to be lubricated. In step S1, it is not necessary to sufficiently cool the heat generating components. In light of this, the amount of oil supplied by the electric pump 62 in step S1 may be set to be smaller than that of oil supplied by the electric pump 62 in step S4. Thus, the electric power consumption in the electric pump 62 can be reduced. Further, in step S1, the electric pump 62 may be controlled to increase the amount of oil supplied by the electric pump 62 as the temperatures of the heat generating components are higher. In this way, the heat generating components can be cooled more effectively.

During preparation for traveling, the electric pump control section 90a executes step S2. The electric pump control section 90a receives the signals from the sensors as inputs, and reads data from particular regions of the memory of the controller 90. When the rider operates the accelerator grip 93a in a state in which the preparation for traveling is completed and the controller 90 determines that the electric motorcycle 1 is permitted to travel on the road, the electric motorcycle 1 starts to travel. During traveling, the output torque or rotational speed of the driving motor 30 is controlled depending on the operation amount of the accelerator grip 93a, and the amount of oil discharged from the mechanical pump 61 is changed, in proportion to the rotational speed of the driving motor 30.

In step S3, the electric pump control section 90a determines whether or not a required cooling capability value P is larger than a mechanical cooling capability value Q. The required cooling capability value P corresponds to the cooling capability required to cool the heat generating components (the components to be cooled) of the driving power device 17 to predetermined temperatures, respectively. The mechanical cooling capability value Q corresponds to the cooling capability of the mechanical pump 61. When the electric pump control section 90a determines that the required cooling capability value P is larger than the mechanical cooling capability value Q (YES), the electric pump control section 90a operates the electric pump 62 in step S4. On the other hand, when the electric pump control section 90a determines that the required cooling capability value P is smaller than the mechanical cooling capability value Q (NO), the electric pump control section 90a stops the operation of the electric pump 62 (stops causing the electric pump 62 to be driven) in step S5. In steps S4 and S5, the electric pump control section 90a operates the electric pump 62 only in a case where it is necessary to enhance the cooling capability, regardless of whether or not the driving motor 30 is operating. This makes it possible to more effectively cool the heat generating components of the driving power device 17, while reducing the electric power consumption in the electric pump 62 (see FIG. 6).

The above-described control for the electric pump 62 is continued until the main switch 91 of the electric motorcycle 1 is turned off. When the main switch 91 is turned off, the operation of the driving motor 30 is stopped. For this reason, in some cases, the mechanical cooling capability value Q is decreased, and the required cooling capability value P becomes larger than the mechanical cooling capability value Q. In these cases, the electric pump control section 90a operates the electric pump 62 until the temperatures of the heat generating components become lower than predetermined values, respectively. This makes it possible to reduce a time period for which the temperatures of the heat generating components are high and prevent a situation in which the heat generating components are degraded or damaged due to the heat.

The electric pump control section 90a calculates the mechanical cooling capability value Q based on the rotational speed of the driving motor 30. For example, in a case where the rotational speed of the driving motor 30 is high, it may be presumed that the supply amount of oil as the "coolant" is increased and the cooling capability is increased. In light of this, the electric pump control section 90a sets the mechanical cooling capability value Q to a larger one as the rotational speed of the driving motor 30 is higher. The electric pump control section 90a derives the rotational speed of the driving motor 30, from data detected by the vehicle speed sensor 96 (see FIG. 4).

Alternatively, the electric pump control section 90a may derive the rotational speed of the driving motor 30 from data detected by the rotational angle sensor 37 (see FIG. 4) or the gear position sensor 94 (see FIG. 4). Further, the electric pump control section 90a may derive the rotational speed of the driving motor 30 from other data detected, which is associated with the rotational speed of the driving motor 30, such as a motor rotation command provided by the inverter 27 or a control device which controls the inverter 27, or a value of a current flowing through the driving motor 30. In a case where the motor rotation command or the current value is used, the electric pump control section 90a can derive the rotational speed of the driving motor 30, without using a sensor which converts a physical amount into an electric signal. In the present embodiment, since the controller 90 controls the operation of the driving motor 30, the electric pump control section 90a can easily calculate the rotational speed of the driving motor 30 based on the motor rotation command, the current value, etc.

The electric pump control section 90a may compensate the mechanical cooling capability value Q based on the detected value, different from the rotational speed of the driving motor 30. For example, in a case where at least one of the discharge pressure of the mechanical pump 61, the ram air pressure of the electric motorcycle 1, and the traveling speed of the electric motorcycle 1 is high, it may be presumed that the heat generating components (components to be cooled) of the driving power device 17 can be cooled by the high-pressure oil or the ram air. In light of this, the electric pump control section 90a may compensate the mechanical cooling capability value Q in such a manner that the mechanical cooling capability value Q is larger as at least one of the discharge pressure, the ram air pressure, and the traveling speed is higher. Further, the electric pump control section 90a may compensate the mechanical cooling capability value Q in view of an outside air temperature or the cooling capability (temperature) of the oil cooler 28. For example, in a case where the outside air temperature is low, it may be presumed that the cooling capability is increased. In light of this, the electric pump control section 90a may compensate the mechanical cooling capability value Q in such a manner that the mechanical cooling capability value Q is larger as the outside air temperature is lower.

The electric pump control section 90a may compensate the mechanical cooling capability value Q based on the temperature of the oil in a state in which the operation of the electric pump 62 is stopped. For example, in a case where the temperature of the oil which has flowed through the oil cooler 28 is low, it may be presumed that the cooling capability is high. In light of this, the electric pump control section 90a may compensate the mechanical cooling capability value Q in such a manner that the mechanical cooling capability value Q is larger as the temperature of the oil which has flowed through the oil cooler 28 is lower. The electric pump control section 90a can derive a value relating to the cooling capability of the oil cooler 28, based on a difference between the temperature of the oil in a region upstream of the oil cooler 28 and the temperature of the oil in a region downstream of the oil cooler 28. Therefore, the electric pump control section 90a may compensate the mechanical cooling capability value Q in such a manner that the mechanical cooling capability value Q is larger as the value relating to the cooling capability of the oil cooler 28 is larger.

As a degree by which the outside air temperature or the oil temperature is lower than the temperature of the heat generating component (component to be cooled), is higher, the heat generating component can be cooled more effectively. In light of this, the electric pump control section 90a may compensate the mechanical cooling capability value Q in such a manner that the mechanical cooling capability value Q is larger as the degree by which the outside air temperature or the oil temperature is lower than the temperature of the heat generating component, is higher. It may be presumed that as the degree by which the temperature of the downstream portion of the heat generating component (component to be cooled) in the oil flow direction is lower than the temperature of the upstream portion of the heat generating component is higher, the heat generating component can be cooled more effectively. In light of this, the electric pump control section 90a may compensate the mechanical cooling capability value Q in such a manner that the mechanical cooling capability value Q is larger as the degree by which the temperature of the downstream portion is lower than the temperature of the upstream portion, is higher.

The electric pump control section 90a calculates the required cooling capability value P based on the estimated heat generation amount of the driving power device 17. As the estimated heat generation amount is larger, a higher cooling capability is required. In light of this, the electric pump control section 90a sets the required cooling capability value P to a larger one as the estimated heat generation amount is larger. In the present embodiment, the inverter 27 and the driving motor 30 of the driving power device 17 are the heat generating components (components to be cooled). The electric pump control section 90a sets a first required cooling capability value P1 based on the estimated heat generation amount of the inverter 27, sets a second required cooling capability value P2 based on the estimated heat generation amount of the driving motor 30, and chooses as the required cooling capability value P, a larger one of the first required cooling capability value P1 and the second required cooling capability value P2.

The electric pump control section 90a can derive the estimated heat generation amounts of the inverter 27 and the driving motor 30 (heat generating components), based on values associated with the heat generation amounts of the heat generating components. For example, the electric pump control section 90a can derive the estimated heat generation amounts of the heat generating components, based on at least one of a signal (requested torque signal) relating to the operation amount of the accelerator grip 93a, the values of the current flowing through the heat generating components, a torque command, a speed command, a traveling speed, a traveling time, the rotational speed of the driving motor 30, a road surface condition (e.g., whether or not the road is an ascending slope), the weight of luggage loaded on the electric motorcycle 1, a state of regenerative braking, the temperatures of the heat generating components, the ambient temperatures of the heat generating components, the temperature of the oil which has flowed through each of the heat generating components, etc. In a case where these values are larger, it may be presumed that the heat generation amounts of the heat generating components are increased. In light of this, the electric pump control section 90a may set the required cooling capability value P to a larger one as at least one of the above temperatures is higher. In this way, a temperature increase in the driving motor 30 can be suppressed. Alternatively, the temperature of each of the heat generating components may be estimated from the value of the current flowing through the heat generating component, the integrated value of the current, the command value, etc.

The electric pump control section 90a may be configured such that, as the rate of increase of the value correlated with the heat generation amount of the heat generating component increases, the required cooling capability value P is similarly increased. In this setting, it becomes possible to accurately predict a future temperature increase in the heat generating component, and more effectively suppress a temperature increase in the heat generating component. Further, the electric pump control section 90a may calculate the required cooling capability value P based on a difference between the value associated with the heat generation amount of the heat generating component and a predetermined value. In a case where the electric motorcycle 1 includes a plurality of heat generating components in which their allowable temperatures are different from each other, the electric pump control section 90a may set the predetermined value for each of the heat generating components, calculate the required cooling capability value for each of the heat generating components, and choose as the required cooling capability value P, a maximum value from among the required cooling capability values of the heat generating components.

In a case where the battery unit 23 (see FIG. 1), which is one of the heat generating components, is a cooling target (component to be cooled), the electric pump control section 90a sets a third required cooling capability value P3 based on the estimated heat generation amount of the battery unit 23, and choose a largest value of the required cooling capability values P1, P2, P3, as the required cooling capability value P. In a case where the driving power device 17 includes a heat generating component different from the inverter 27, the driving motor 30 and the battery unit 23, the electric pump control section 90a may set a required cooling capability value P4 based on the estimated heat generation amount of this heat generating component, and set the required cooling capability value P, based on the required cooling capability value P4 as well as the required cooling capability values P1, P2, P3. Further, the electric pump control section 90a may set the required cooling capability value P based on a highest one of the actual temperatures of the plurality of heat generating components.

The electric pump control section 90a may compensate the required cooling capability value P, based on the heat generation amount, allowable temperature, heat accumulation amount (the temperature changes less easily as the heat accumulation amount is larger), or the like of the heat generating component. For example, in a case where the heat accumulation amount of the heat generating component is larger, a larger amount of oil becomes necessary to cool the heat generating component. In light of this, the electric pump control section 90a may compensate the required cooling capability value P in such a manner that the required cooling capability value P is larger as the heat accumulation amount of the heat generating component is larger.

In accordance with the present embodiment, since the electric pump 62 can compensate the oil supply capability of the mechanical pump 61, the resistance of the driving motor 30 can be reduced, and the electric power consumption in the driving motor 30 can be reduced. The electric pump 62 is operated primarily in a case where it is necessary to cool the heat generating components. Therefore, the operation time of the electric pump 62 can be reduced, and the electric power consumption in the electric pump 62 can be reduced.

Other Embodiments

The above-described embodiment is merely exemplary, and is not intended to limit the present invention, its application, or its use. For example, although in the above-described embodiment, the oil discharged from the mechanical pump 61 and the oil discharged from the electric pump 62 are supplied to the heat generating components (components to be cooled) through the common oil passage, they may be supplied to the heat generating components (components to be cooled) through separate oil passages, respectively.

Although in the above-described embodiment, the driving power of the driving motor 30 is transmitted to the mechanical pump 61 via the gear which is rotatable with the clutch gear 43, this driving power may be transmitted to the mechanical pump 61 via other members. For example, the driving power may be transmitted to the mechanical pump 61 via a rotary member which is included in the clutch mechanism and is different from the gear, or a rotary member included in the transmission 40. Even in a case where the driving power is not transmitted to the mechanical pump 61 via the clutch mechanism or the transmission 40, during, for example, idling, the electric pump 62 is operated to supply the oil to the heat generating components or the like.

Although in the above-described embodiment, the electric pump control section 90a sets the required cooling capability values P1, P2, P3, P4 for the plurality of heat generating components, respectively, and chooses a largest value of the required cooling capability values P1, P2, P3, P4, as the required cooling capability value P, the electric pump control section 90a may add the required cooling capability values P1, P2, P3, P4, and use the resulting value as the required cooling capability value P.

Although in the above-described embodiment, the electric pump control section 90a calculates the mechanical cooling capability value Q based on the rotational speed of the driving motor 30, the electric pump control section 90a may calculate the mechanical cooling capability value Q based on a detected value (e.g., temperature of the oil cooler 28) different from the rotational speed of the driving motor 30.

Further, the electric pump control section 90*a* may set the mechanical cooling capability value Q to a predetermined constant value.

In a case where the discharge amount (rotational speed) of the electric pump 62 can be changed, the electric pump control section 90*a* may control the operation of the electric pump 62 to increase the amount of compensated cooling capability in such a manner that the discharge amount is larger (the rotational speed is higher) as the required cooling capability value P is larger or a difference (P−Q) between the required cooling capability value P and the mechanical cooling capability value Q is larger. It may be presumed that the cooling capability of the mechanical pump 61 is insufficient as the required cooling capability value P is larger or the difference (P−Q) between the required cooling capability value P and the mechanical cooling capability value Q is larger. In this case, the electric pump control section 90*a* increases the amount of cooling capability to be compensated by the electric pump 62. Thus, the heat generating components of the driving power device 17 can be cooled more effectively.

Further, in a case where the output mode of the driving motor 30 can be shifted between a first output mode in which the output is low and a second output mode in which the output is high, the electric pump control section 90*a* may set the required cooling capability value P in the second output mode larger than the required cooling capability value P in the first output mode. In a case where the electric pump control section 90*a* determines that a road surface on which the electric motorcycle 1 is traveling is a road surface which requires a high output, such as an express highway or a circuit, the electric pump control section 90*a* may set the required cooling capability value P to a larger one. Further, the electric pump control section 90*a* may store the history of the operation of the electric pump 62. When the electric pump control section 90*a* determines that the operation of the electric pump 62 has occurred frequently, based on the history of the operation, the electric pump control section 90*a* may set the required cooling capability value P to a larger one.

The electric pump control section 90*a* may estimate the required cooling capability value P and the mechanical cooling capability value Q after a passage of a specified time, based on changes over time in the detected values of the sensors, etc., and control the operation of the electric pump 62 based on the estimated required cooling capability value P and the estimated mechanical cooling capability value Q. In this case, the heat generating components can be cooled effectively at an earlier stage. In addition, the number of times the electric pump 62 is operated can be reduced, and thus, the electric power consumption in the electric pump 62 can be lessened.

The electric pump control section 90*a* may set the required cooling capability value P (or P−Q) used to operate the electric pump 62 and the required cooling capability value P (or P−Q) used to stop the operation of the electric pump 62 to different values, respectively. This makes it possible to preferentially prevent the thermal degradation of the heat generating components or preferentially reduce the number of times or duration of time of the operation of the electric pump 62.

In a basic operation control, the electric pump control section 90*a* operates the electric pump 62 when the required cooling capability value P is larger than the mechanical cooling capability value Q and stops the operation of the electric pump 62 when the required cooling capability value P is smaller than the mechanical cooling capability value Q.

In addition to or instead of this basic operation control, the electric pump control section 90*a* may execute the following operation control.

The electric pump control section 90*a* may operate the electric pump 62 when the electric pump control section 90*a* determines that the required cooling capability value P is larger than a predetermined value in a state in which the operation of the driving motor 30 is stopped. In this case, the electric pump 62 can be operated irrelevantly to the mechanical cooling capability value Q. As a result, the cooling capability can be compensated more reliably.

When the amount and pressure of the oil discharged from the mechanical pump 61 are increased with an increase in the rotational speed of the driving motor 30, the cooling capability of the mechanical pump 61 is increased. For this reason, the insufficiency of the cooling capability may not occur, even when the rotational speed of the electric pump 62 is set to be low. In light of this, the electric pump control section 90*a* may control the operation of the electric pump 62 in such a manner that the discharge amount is smaller (the rotational speed is lower) as the rotational speed of the driving motor 30 is higher. Further, the electric pump control section 90*a* may stop the operation of the electric pump 62 when the rotational speed of the driving motor 30 exceeds a predetermined value. This makes it possible to reduce the electric power consumption in the electric pump 62.

The electric pump control section 90*a* may control the operation of the electric pump 62 in such a manner that a change in the supply amount of the oil, which occurs with a change in the rotational speed of the driving motor 30, while the electric motorcycle 1 is traveling, is suppressed. For example, the electric pump control section 90*a* may control the operation of the electric pump 62 in such a manner that the rotational speed of the electric pump 62 is lower when the rotational speed of the driving motor 30 is higher, and is higher when the rotational speed of the driving motor 30 is lower. Further, the electric pump control section 90*a* may control the operation of the electric pump 62 in such a manner that the discharge amount of the electric pump 62 is reduced when the rotational speed of the driving motor 30 (or a change over time in the rotational speed of the driving motor 30) has been increased by a specified amount or more within a specified time period, and is increased when the rotational speed of the driving motor 30 (or a change over time in the rotational speed of the driving motor 30) has been reduced by a specified amount or more within a specified time. This makes it possible to prevent a rapid change in the oil flow.

When the required cooling capability value P becomes smaller than the mechanical cooling capability value Q, while the mechanical cooling capability value Q and the required cooling capability value P are reduced together, the operation of the electric pump 62 is stopped. In this state, it may be difficult to sufficiently cool the heat generating components of the driving power device 17. To avoid this, in a case where the required cooling capability value P is reduced concurrently with the reduction of the mechanical cooling capability value Q, for example, in a case where the electric motorcycle 1 is coasting in a state in which the operation of the driving motor 30 is stopped, the electric pump control section 90*a* may set a reduction rate of the required cooling capability value P to be lower than that of the mechanical cooling capability value Q. This makes it possible to retard the timing at which the operation of the electric pump 62 is stopped. Thus, the heat generating components can be cooled sufficiently.

The electric pump control section 90a may operate the electric pump 62 when the temperature of at least one of the inverter 27 and the driving motor 30 exceeds the corresponding one of predetermined temperatures individually set for them. In a case where the temperature of each of the inverter 27 and the driving motor 30 becomes excessively high, it becomes necessary to cool them urgently. In this case, the electric pump control section 90a may operate the electric pump 62 to compensate the cooling capability quickly. Further, the electric pump control section 90a may stop the operation of the electric pump 62, when the temperatures of both the inverter 27 and the driving motor 30 become lower than the predetermined temperatures individually set for them, respectively.

In a case where the rotational speed of the driving motor 30 is low, the estimated heat generation amounts of the heat generating components of the driving power device 17 are reduced, and the required cooling capability value P becomes smaller than the mechanical cooling capability value Q. In this case, the electric pump 62 does not operate, and therefore cannot compensate the cooling capability for cooling the heat generating components, even in a case where it is necessary to compensate the cooling capability. To avoid this, as shown in FIG. 7, the electric pump control section 90a sets a requested torque based on a signal (a requested torque signal corresponding to the magnitude of the requested torque), relating to the operation amount of the accelerator grip 93a which is output from the accelerator sensor 93, and operates the electric pump 62 when the requested torque is equal to or larger than a predetermined reference value R.

Specifically, it may be presumed that with an increase in the requested torque, the rotational speed of the driving motor 30 is increased and the heat generation amounts of the heat generating components are increased in the future. In light of this, the electric pump control section 90a may operate the electric pump 62 to cool the heat generating components of the driving power device 17, when the requested torque is equal to or larger than the predetermined reference value R. In this configuration, the accelerator sensor 93 is a "requested torque signal output section" which outputs a requested torque signal corresponding to the magnitude of the requested torque. Further, in this configuration, the electric pump control section 90a may control the operation of the electric pump 62 in such a manner that the rotational speed of the electric pump 62 is higher as the requested torque is larger.

Figure 7:
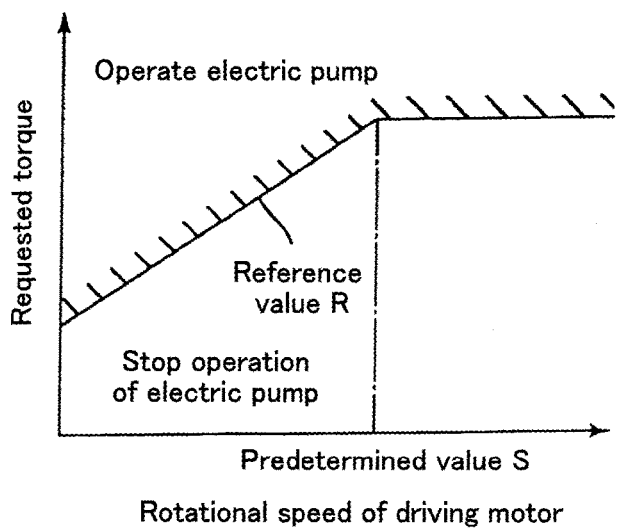
FIG. 7 is a graph showing an example in which the cooling capability of the mechanical pump is compensated by the operation of the electric pump, when a requested torque is equal to or larger than a predetermined reference value.

As shown in FIG. 7, in a case where the electric pump 62 is operated when the requested torque is equal to or larger than the predetermined reference value R, and the rotational speed of the driving motor 30 is lower than a predetermined value S, the electric pump control section 90a may set the reference value R to a smaller one as the rotational speed of the driving motor 30 is lower. In this setting, the electric pump 62 is easily operated when the rotational speed of the driving motor 30 is low. As a result, the heat generating components can be cooled more effectively.

The electric vehicle of the present invention is not limited to the electric motorcycle, and may be, for example, an all-terrain vehicle (ATV), a small truck, etc. Also, the electric vehicle of the present invention may be an electric vehicle incorporating a fuel cell as a driving power source, or a hybrid electric vehicle incorporating the driving motor 30 and an engine as the driving power source.

REFERENCE CHARACTER LIST 1 electric motorcycle (electric vehicle)
5 motor unit
17 driving power device
27 inverter
30 driving motor
40 transmission
61 mechanical pump
62 electric pump
90 controller
90a electric pump control section
95, 92 temperature sensor
93 accelerator sensor (requested torque signal output section)

The invention claimed is:

1. An electric vehicle comprising:
a driving power device which includes at least one heat generating component which generates heat during an operation of the heat generating component and drives a wheel;
a mechanical pump which supplies an oil to the heat generating component;
an electric pump which supplies the oil to the heat generating component; and
an electric pump control section which controls an operation of the electric pump;
wherein the at least one heat generating component includes a driving motor,
wherein the mechanical pump is mechanically driven by the driving motor and supplies to the heat generating component the oil in an amount which is proportional to a rotational speed of the driving motor,
wherein oil discharge ports of the mechanical pump and electric pump are connected to a main oil passage,
wherein a transmission oil passage, a motor oil passage, and an oil cooler oil passage branch from the main oil passage, the transmission oil passage supplying the oil to a transmission, the motor oil passage supplying the oil to a bearing of the driving motor, the oil cooler oil passage supplying the oil to the heat generating component through an oil cooler,
wherein the electric pump control section causes the electric pump to be driven when the electric pump control section determines that a required cooling capability value corresponding to a required cooling capability required to cool the heat generating component is larger than a mechanical cooling capability value corresponding to a cooling capability of the mechanical pump, the electric pump control section configured such that, as a rate of increase of a value correlated with a heat generation amount of the heat generating component increases, the electric pump control section increases the required cooling capability value similarly to the increase in the rate of increase of the value correlated with the heat generation amount, and
wherein the electric pump control section stops causing the electric pump to be driven when the required cooling capability value is smaller than the mechanical cooling capability value.

2. The electric vehicle according to claim 1, wherein the electric pump control section sets the mechanical cooling capability value based on the rotational speed of the driving motor.

3. The electric vehicle according to claim 1, wherein the electric pump control section sets the required cooling capability value based on an estimated heat generation amount of the heat generating component.

4. The electric vehicle according to claim 1,
wherein the electric pump control section sets the required cooling capability value based on a temperature of the heat generating component.

5. The electric vehicle according to claim 1,
wherein the electric pump control section sets the required cooling capability value and the mechanical cooling capability value in such a manner that a reduction rate of the required cooling capability value is lower than a reduction rate of the mechanical cooling capability value.

6. The electric vehicle according to claim 1,
wherein the electric pump control section causes the electric pump to be driven when the electric pump control section determines that the required cooling capability value is larger than a predetermined value in a state in which an operation of the driving motor is stopped.

7. The electric vehicle according to claim 1,
wherein the electric pump control section controls the operation of the electric pump in such a manner that an amount of the oil discharged from the electric pump is larger as the required cooling capability value is larger.

8. The electric vehicle according to claim 1,
wherein the electric pump control section controls the operation of the electric pump in such a manner that an amount of the oil discharged from the electric pump is smaller as the rotational speed of the driving motor is higher.

9. The electric vehicle according to claim 1, further comprising:
a requested torque signal output section which outputs a requested torque signal corresponding to a magnitude of a requested torque,
wherein the electric pump control section causes the electric pump to be driven when the requested torque indicated by the requested torque signal output from the requested torque signal output section is equal to or larger than a predetermined reference value.

10. The electric vehicle according to claim 1,
wherein the at least one heat generating component of the driving power device is a part of a plurality of heat generating components including a first heat generating component and a second heat generating component, and
wherein the first heat generating component includes the driving motor, and the second heat generating component includes an inverter.

11. The electric vehicle according to claim 10,
wherein the electric pump control section sets the required cooling capability value based on a larger one of an estimated heat generation amount of the driving motor and an estimated heat generation amount of the inverter.

12. The electric vehicle according to claim 1, further comprising:
an oil pan in which oil is reserved,
wherein the oil cooler cools the oil supplied from the oil pan by the electric pump, and
wherein the electric pump control section controls the operation of the electric pump based on a difference between an outside air temperature or a temperature of the oil which has flowed through the oil cooler, and a temperature of the heat generating component.

13. The electric vehicle according to claim 1, further comprising:
an oil pan in which oil is reserved,
wherein the oil cooler cools the oil supplied from the oil pan by the electric pump,
wherein the electric pump control section sets the required cooling capability value based on a rotational command provided to the driving motor or a value of a current flowing through the driving motor,
wherein the electric pump control section sets the mechanical cooling capability value based on an outside air temperature or a cooling capability of the oil cooler, and
wherein when the electric pump control section determines that the required cooling capability value is larger than the mechanical cooling capability value, the electric pump control section causes the electric pump to be driven.

14. The electric vehicle according to claim 1,
wherein the electric pump control section sets the required cooling capability value to a larger one, as an increase rate per unit time, of an estimated heat generation amount of the heat generating component is higher.

15. The electric vehicle according to claim 1,
wherein the electric pump control section sets the required cooling capability value based on a history of the operation of the electric pump.

16. The electric vehicle according to claim 1,
wherein the electric pump control section sets the required cooling capability value used to cause the electric pump to be driven and the required cooling capability value used to stop causing the electric pump to be driven, to different values, respectively.

17. The electric vehicle according to claim 1,
wherein the electric pump control section sets a rotational speed of the electric pump in such a manner that the rotational speed of the electric pump during preparation for travelling of the electric vehicle is lower than the rotational speed of the electric pump during traveling.

18. The electric vehicle according to claim 1,
wherein the electric pump control section controls the electric pump in such a manner that a discharge amount of the electric pump is reduced when the rotational speed of the driving motor or a change over time in the rotational speed of the driving motor has been increased by a first specified amount or more within a specified time period, and is increased when the rotational speed of the driving motor or the change over time in the rotational speed of the driving motor has been reduced by a second specified amount or more within a specified time.

* * * * *